July 1, 1930.  E. R. VIBERG  1,769,556

ARTICULATED CAR

Filed April 15, 1929   2 Sheets-Sheet 1

INVENTOR
ERNEST R. VIBERG
BY Fetherstonhaugh & Co
ATTORNEYS

July 1, 1930.　　　　E. R. VIBERG　　　　1,769,556
ARTICULATED CAR
Filed April 15, 1929　　　2 Sheets-Sheet 2

INVENTOR
ERNEST. R. VIBERG

BY *Fetherstonhaugh & Co*
ATTORNEYS

Patented July 1, 1930

1,769,556

UNITED STATES PATENT OFFICE

ERNEST R. VIBERG, OF MONTREAL, QUEBEC, CANADA

ARTICULATED CAR

Application filed April 15, 1929. Serial No. 355,232.

This invention relates to new and useful improvements in articulated cars and particularly to the platform between the sections and the ends of the sections in proximity to the platform and the object of the invention is to provide a platform connecting the sections in such a manner that the width of the passageway between the sections is constant and the effective floor area of the platform is also constant.

According to my invention, I provide a car built of two or more sections with the adjacent ends of each pair of sections resting on a common truck. Secured to the brackets extending upwardly from the truck is a platform of circular form. The edges of the platform at parts of its periphery fit into recesses in the adjacent ends of the car sections. The upper surface of the platform is made level with the floors of the car sections so that a clear platform is provided between them.

In the drawings which illustrate my invention:—

Figure 1:
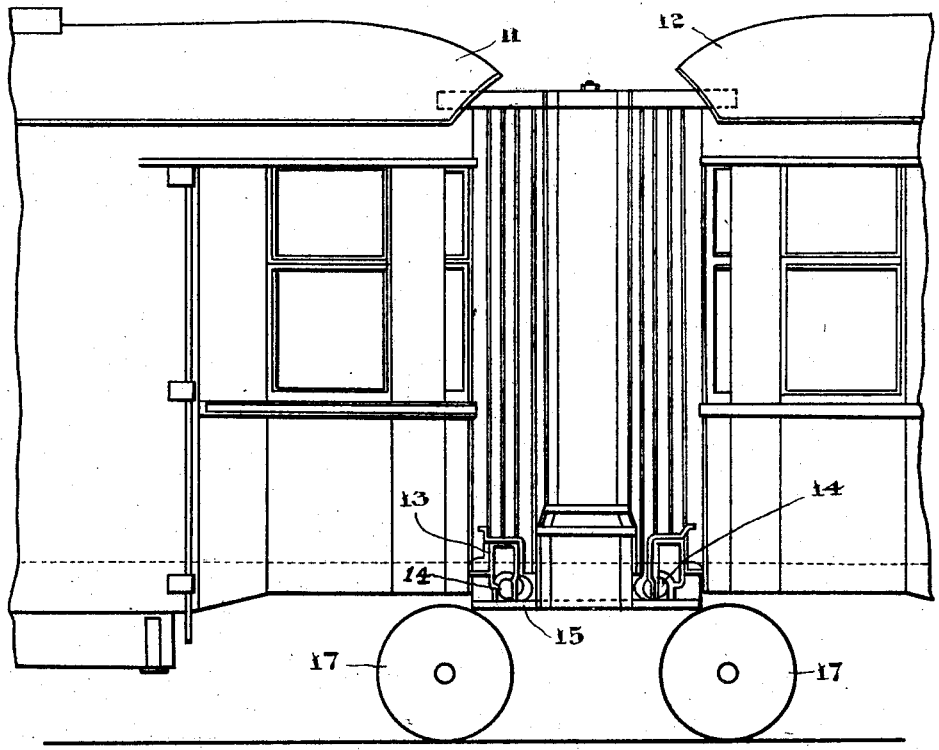
Figure 1 is a side elevation of the adjacent ends of the articulated car with my improved type of platform therebetween.
Figure 2:
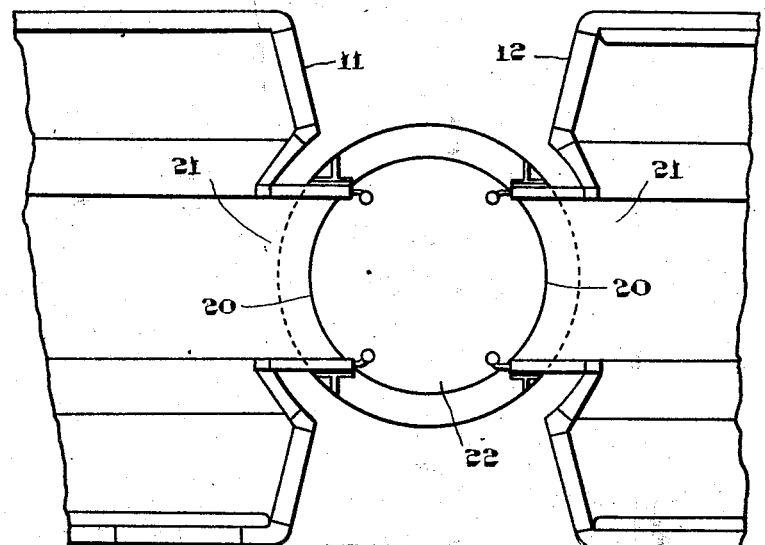
Figure 2 is an interior plan view of the ends shown in Figure 1.
Figure 4:
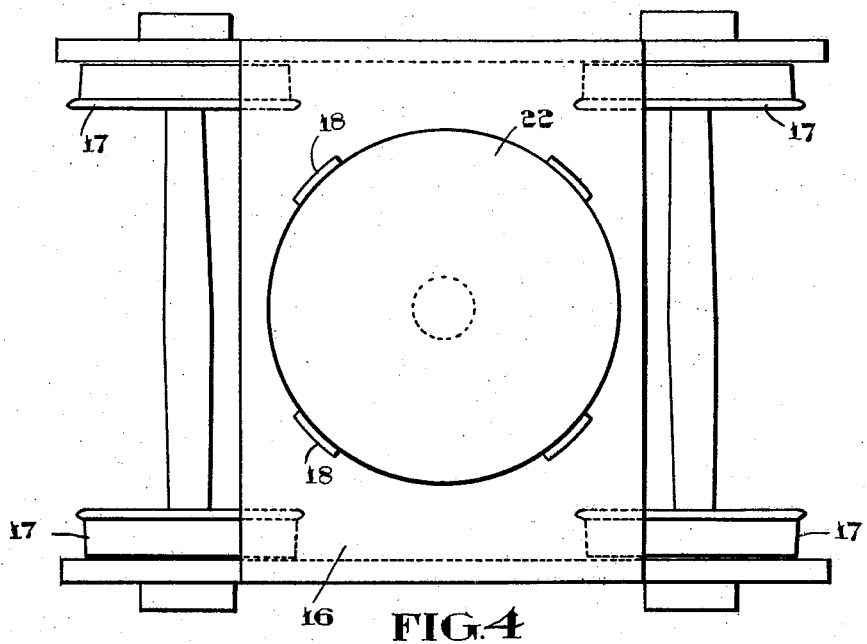
Figure 4 is an enlarged plan view of the parts shown in Figure 3.
Figure 3:
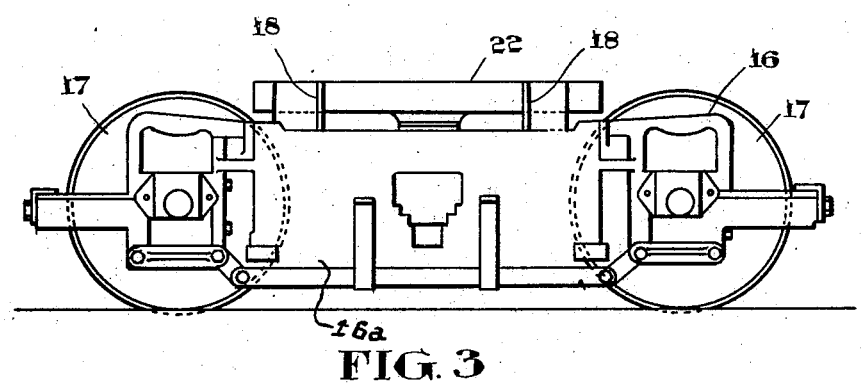
Figure 3 is an enlarged side elevation of the truck.

Referring more particularly to the drawings, 11 and 12 designate the adjacent ends of sections of an articulated car. The ends are spaced from one another. Each end has downwardly projecting brackets 13 with the rollers 14 rotatably mounted therein. The rollers rest on race ways 15 secured to the upper plate 16 of a truck 16ᵃ. The truck is secured to the sections by suitable links not shown and is adapted to support the adjacent ends of the sections to allow relative rotative movement between them and the truck. The truck is mounted on the travelling wheels 17. Secured to brackets 18 extending upwardly from the plate 16 is the platform 22 between the sections. The platform is of circular form and fits into recesses 20 formed in the ends of the sections. The recesses conform to the periphery of the platform, the upper surface of which is substantially level with the floors of the sections. The centre of the circular platform coincides with the central vertical axis of the truck and the ends of the car are so supported that they swing around said axis when the car is taking a curve. The ends of the sections are provided with an opening 21 to allow passengers to pass through from one section to the other in proximity thereto. It will be seen that the effective opening on to the platform is constant and the effective floor area is also constant so that at all times during the travelling of the car passengers may safely pass between the sections.

Having thus described my invention, what I claim is:—

1. In an articulated car, a body built in separate sections, a truck adapted to support the adjacent ends of the said sections, and a unitary platform secured to the truck and adapted under all conditions to span the passage openings in the adjacent ends of the sections.

2. In an articulated car, a body built in separate sections, a truck adapted to support the adjacent ends of the sections as they hinge about the central axis of the truck, a circular platform secured to the truck adapted under all conditions to span the passageway opening in the adjacent ends of the cars.

3. In an articulated car, a body built in sections, a truck adapted to support the adjacent ends of the sections so that they hinge about the central axis of the truck and a circular platform secured to the upper surface of the truck and adapted to fit into recesses formed in the said section ends, the upper surface of the said platform being in substantial alignment with passageways in the sections.

In witness whereof, I have hereunto set my hand.

ERNEST R. VIBERG.